United States Patent

Wei et al.

Patent Number: 5,518,660
Date of Patent: May 21, 1996

[54] AQUEOUS COLLOIDAL DISPERSIONS OF SUB-MICROMETER ALUMINA PARTICLES

[75] Inventors: Wen-Cheng Wei; Su-Jen Lu, both of Taipei, Taiwan

[73] Assignee: National Science Council, Taipei, Taiwan

[21] Appl. No.: 236,560

[22] Filed: May 2, 1994

[51] Int. Cl.$^6$ .............. B01J 13/00; B01F 3/00; C22B 21/00

[52] U.S. Cl. .............. 252/313.1; 501/127; 423/111; 423/132

[58] Field of Search .............. 252/313.1; 501/127; 423/111, 132

[56] References Cited

U.S. PATENT DOCUMENTS

| | | | |
|---|---|---|---|
| 2,970,966 | 2/1961 | Hoekstra | 252/313.1 |
| 4,676,928 | 6/1987 | Leach et al. | 252/313.1 |
| 4,888,248 | 12/1989 | Hirai et al. | 252/313.1 |
| 4,929,433 | 5/1990 | Hexemer et al. | 501/96 |
| 5,246,624 | 9/1993 | Miller et al. | 252/313.2 |
| 5,384,291 | 1/1995 | Weimer et al. | 501/81 |
| 5,433,774 | 7/1995 | Kapl et al. | 106/36 |

OTHER PUBLICATIONS

Cesarano et al., "Stability of Aqueous $\alpha$–$Al_2O_3$ Suspensions with Poly(methacrylic acid) Polyelectrolyte", J. American Ceramic Society, vol. 71, No. 4, (1988) pp. 250–255.

N. McN. Alford et al., "High–strength ceramics through colloidal control to remove defects", Nature, vol. 330, No. 5, Nov., 1987.

Tsung–Shou Yeh and Michael D. Sacks, "Low–Temperature Sintering of Alumninum Oxide", J. Am. Ceram. Soc., 71 [10] 841–44 (1988).

Hiroyuki Mizuta, Kiichi Oda, Yasuo Shibasaki, Masaki Maeda, Michihide Machida and Kazuyuki Ohshima, "Preparation of High–Strength and Translucent Alumina by Hot Isostatic Pressing", J. Am. Ceram. Soc., 75 [2] 469–73 (1992).

Primary Examiner—Richard D. Lovering
Assistant Examiner—Daniel S. Metzmaier
Attorney, Agent, or Firm—Hitt Chwang & Gaines

[57] ABSTRACT

An aqueous alumina dispersion prepared from high quality, submicrometer alumina powder, suitable for manufacturing fine ceramic products, is disclosed. The sub-micrometer alumina particles have a surface area of 2.5 to 50 m$^2$ per gram of the alumina particles. There are three components in the dispersion: sub-micrometer alumina particles (10 to 68 percent based on weight of the colloidal dispersion), semi-carbazide hydrochloride derivative (0.1 to 5 percent based on the weight of the alumina particles), and water (the balance).

7 Claims, 4 Drawing Sheets

AQUEOUS COLLOIDAL DISPERSIONS OF SUB-MICROMETER ALUMINA PARTICLES

FIELD OF THE INVENTION

The present invention relates generally to an aqueous colloidal dispersion of sub-micrometer alumina particles, and more particularly to an aqueous colloidal dispersion of sub-micrometer alumina particles using semicarbazide acidic compound as a dispersion agent.

BACKGROUND OF THE INVENTION

Alumina has long been the major raw material for the production of fine ceramics, especially in the fabrication of the electrical circuit substrates. High-purity (purity >99%) and fine-grained alumina ceramics have recently been developed to improve the tensile strength and abrasion resistance thereof. The manufacturing process of these high-purity and fine-grained alumina ceramics generally comprises the following steps:

1) preparing an aqueous dispersion of fine-sized alumina particles;

2) casting the aqueous dispersion to form a green body; and 3) sintering the green body.

Recent study shows that the colloidal processing can effectively enhance the strength of fine ceramics. {H. Mizuta et al., *J. Am. Ceram. Soc.,* 75[2] pp. 469–473 (1992); N. McN. Alford et al., *Nature,* Vol. 330[5] pp. 51–53 (1987)} Further, green bodies of complicated shapes can be formed using various casting techniques such as slip casting and pressure casting, wherein uniformly distributed sub-micrometer alumina particles having no substantial agglomerates are used to prepare an aqueous colloidal suspension (or termed "slurry"), and the aqueous colloidal dispersion is then casted to form a relatively dense green body. The green body is dried to an appropriate extent and then sintered into a ceramic product having a homogeneous microstructure of average grain size ranging 1–10 μm, whereby the ceramic product have a better mechanical strength.

Up to the present, none of the existing processes that involve colloidal processing of agglomerate-free sub-micrometer alumina particles use transition phase alumina particles. Moreover, in order to obtain the uniformly distributed and agglomerate-free sub-micrometer alumina particles a sedimentation or centrifugal casting process are required to eliminate large particles and avoid agglomeration, and these in turn cause a loss of the high purity alumina particles.

Because their specific surface area is greater than 15 m²/g, the above mentioned uniformly distributed and sub-micrometer alumina particles require a very powerful dispersion agent to ensure that a high solid content aqueous colloidal slurry of the sub-micrometer alumina particles can be prepared. Generally, there are two types of dispersing agents. The first type of dispersing agent can make the surface of a particle charged and the Coulombic forces thereby generated between the particles can ensure an effective dispersion. The second type of dispersing agent generates steric hindrance between particles to achieve effective dispersion.

As disclosed in U.S. Pat. No. 5,246,624, an electrostatically stabilized dispersion of alumina particles is usually achieved by controlling the pH value of the slurry. However, this method of controlling pH value is less than ideal when dealing with alumina particles having a large specific surface. {For further information in this regard, please refer to Cesarano and Aksay, *J. Am. Ceram. Soc.,* 71[4]250–255 (1988)} Alumina particles with a large specific surface tend to neutralize acidic or basic conditions when they are well mixed in an aqueous solvent medium. In neutral condition, the alumina particles slurry has a tendency to turn into gel because hydrogen bonds will be formed between the surfaces of the sub-micrometer alumina particles and thus cause a bridging effect. The gelling of the slurry could cause a problem as air bubbles generated during mixing are more likely to remain in the slurry because of its increased viscosity.

The second type polymer based dispersion agent, especially high molecular weight polymer, could jeopardize the process of manufacturing ceramics because of the complicated nature of how they are adsorbed to and desorbed from the surface of the alumina particles, and how they affect the viscosity of the slurry.

The primary objective of the present invention is to provide an aqueous colloidal dispersion of sub-micrometer alumina particles for manufacturing high-density and fine-grained ceramics.

Another objective of the present invention is to provide a new electrolyte based dispersing agent for preparing a high solid content and sedimentation-free aqueous dispersion of sub-micrometer alumina particles, in which transition phase sub-micrometer alumina particles can be used for the preparation.

SUMMARY OF THE INVENTION

In order to accomplish these objectives, a stable aqueous colloidal dispersion of sub-micrometer alumina particles prepared in accordance with the present invention comprises 10 to 68% of sub-micrometer alumina particles having a surface area of 2.5 to 50 m² per gram of the alumina particles, by weight of said aqueous colloidal dispersion; 0.1 to 5% of a semicarbazide hydrochloride derivative, based on the weight of the alumina particles; and water as the balance.

The chemical formula of the semicarbazide hydrochloride derivative which functions as a dispersing agent is as follows:

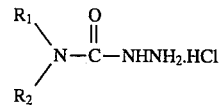

wherein $R_1$ and $R_2$ are hydrogen, $C_1$–$C_4$ alkyl group, or amino group independently, preferably both are hydrogen.

As shown in the above formula, the HCl ligand can be easily released when it is dispersed in water. Therefore, the dispersing agent is able to acidize the dispersion to avoid agglomeration. Further, it does not contain any easily impure substance such as sodium and phosphorus which remains as a contaminant after sintering. As a result, ceramics with average grain sizes of few micrometers and homogeneous microstructure can be more easily obtained by using the aqueous colloidal dispersion of sub-micrometer alumina particles of the present invention.

DETAILED DESCRIPTION OF THE INVENTION

Figure 1:
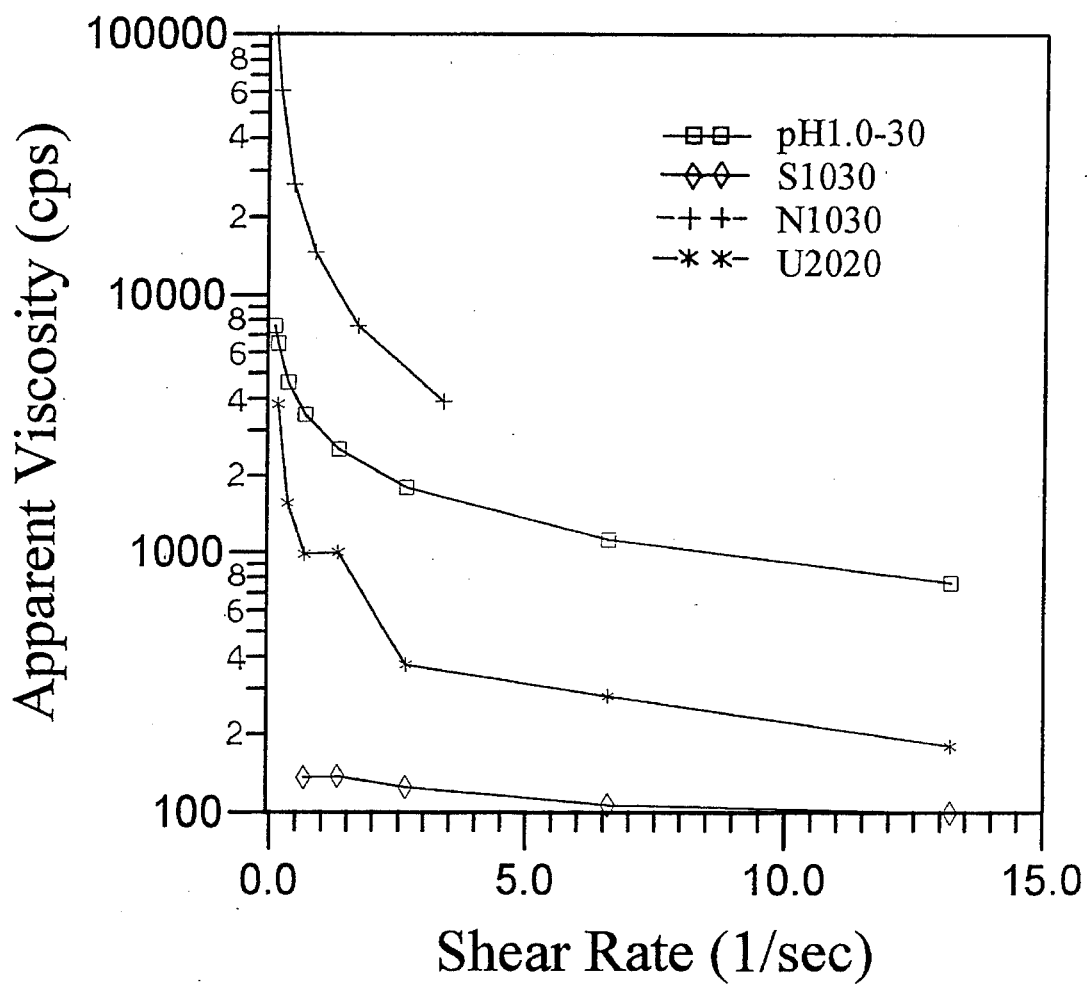
FIG. 1 shows the relationships between the shear rate and the viscosity of the dispersions prepared by several different dispersing agents and one alumina powder.

The present invention focuses on the discovery of a suitable electrolyte dispersing agent which can be effectively applied in the preparation of a stable and superior aqueous colloidal dispersion (slurry) of sub-micrometer alumina particles, and facilitates the casting of the colloidal dispersion to form a green body by the methods such as pressure casting, doctor blade casting, and slip casting, and the sintering of the green body.

The alumina particles suitable to be used in the present invention are not limited to the stable phase alumina particles. The transition phase alumina particles can also be used. The average particle size is less than one micrometer, preferably in the range of 0.1–0.6 micrometer. Each gram of these particles have a surface area from 2.5 $m^2$ to 50 $m^2$. Preferably, the alumina particles have a purity of above 99.0%; however, the alumina particles having a purity down to 96.0% are also applicable. A suitable amount of the alumina particles used in the colloidal dispersion is ranging from 10 to 68%, preferably 30–68%, based on the weight of the colloidal dispersion.

The suitable electrolyte dispersing agents which can be effectively applied in the preparation of a stable and superior aqueous colloidal dispersion (slurry) of sub-micrometer alumina particles are semicarbazide hydrochloride derivatives, which have the following chemical structure

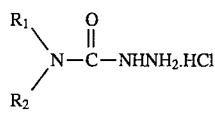

wherein $R_1$ and $R_2$ could be either hydrogen, $C_1$–$C_4$ alkyl group or amino group independently, but preferably both are hydrogen. The amount of this dispersing agent used is set at 0.1–5% by weight of the alumina particles, but preferably in the range of 0.1–2%.

Generally, we can evaluate the effectiveness of a dispersing agent by observing the behavior of particle sedimentation or by studying the relationship between the slurry viscosity and the shear rate. Powders suspended in a liquid spontaneously agglomerate unless they are suitably deflocculated. If the alumina particles are well dispersed in a liquid through the use of the dispersing agent, the soft agglomerates of particles will be deflocculated, and thus a primary particles having smaller diameters will be formed such that the sedimentation rate thereof will be decreased and the resulting sedimentation will be more compact, whereby its suspension is nearly opaque due to a relatively large amount of fine-sized particles being suspended in the liquid. As to the slurry viscosity, a good colloidal dispersion has a relatively low viscosity in view of the fact that a good colloidal dispersion has a relative large quantity of effective solution. On the contrary, a poor dispersion results in nearly transparent suspension and a less compact sedimentation, because of a faster sedimentation speed of agglomerates. Moreover, agglomerates in the poor dispersion results in a 3-dimension bonding structure of the dispersion, and thus a higher viscosity of the dispersion.

The aqueous colloidal dispersion of alumina particles prepared by the present invention features low viscosity, properties of Newtonian fluid, and no substantial sedimentation after storage for a period of time.

EXAMPLE 1

The present example illustrates the preparation of five aqueous colloidal dispersions by using one type of alumina particles with five different dispersing agents. The alumina particles marketed by CERALOX company, USA, and having code name of APA-0.2 were used, which have an average diameter ($d_{50}$) of 0.2 μm, a specific surface area of 38 $m^2$/g, 99% or above in purity, partly α phase and mainly e-phase. The five dispersing agents were ammonium carbonate (reagent grade, Shimakyu Pure Chemical Industries Ltd., Japan), semicarbazide hydrochloride (98.5% in purity, Hayashi Pure Chemical Industries Ltd., Japan), urea (99% in purity, Kanto Chemical Co., Inc., Japan), Darvan C (R. T. Vanderbilt Co., Inc., USA), and sodium hexametaphosphate (reagent grade, Riedelode Haen AG, Germany).

APA-0.2 alumina particles and a 0.5 wt % aqueous solution of the dispersing agent were mixed, in which deionized water was used and the solid phase content was 10 vol %. The mixture was ultrasonicated at 28 KHz, 50W for a period of 20 minutes. The resulting slurry was poured into a measuring cylinder, and the slurry height ($H_0$) was measured. The cylinder was sealed for two months for sedimentation. The sedimentation height was measured and recorded ($H_f$). The $H_f/H_0$ ratios of five different dispersions were calculated and listed in Table 1.

Among the dispersing agents listed in Table 1, Darvan C is widely used as a dispersing agent for alumina particles, R—COO— structure of which can generates steric hindrance or electrosteric hindrance after being adsorbed on the surface of the alumina particle. However, it probably because of a very large specific surface area of APA-0.2 alumina particles, the long polymer chains of Darvan C become attractive to one another, which leads to the dispersing effectiveness of Darvan C is not satisfactory. While semicarbazide hydrochloride and urea are low molecular weight compounds and similar in structure, they are very much different in pH value. The former is a strong acid, and the latter is a weak alkali. Although sodium hexametaphosphate is highly effective as a dispersing agent for alumina particles, it is not suitable for manufacturing high quality ceramic products because sodium salt will form low-melting-temperature oxides during sintering and can not be removed therefrom.

TABLE 1

| Dispersing agent, (chemical formula) | $H_f/H_0$ | Dispersing effect |
|---|---|---|
| Ammonium carbonate, $(NH_4)HCO_3(NH_4)CO_2NH_2$ | 0.7 | poor |
| Semicarbazide hydrochloride, $H_2NCONHNH_2$ | opaque, no sedimentation | excellent |
| Urea, $H_2NCONH_2$ | opaque, no sedimentation | excellent |
| Darvan C, $(CH_3CHCHCOO-NH_4)n$ | 0.62 | poor |
| Sodium hexametaphosphate, $(NaPO_3)_6$ | opaque, no sedimentation | excellent |

EXAMPLE 2

Four different aqueous colloidal dispersions of APA-0.2 alumina particles were prepared and the rheological properties thereof were examined. APA-0.2 alumina particles were dispersed in deionized water with one of the following different dispersing agents: semicarbazide hydrochloride ("S"), sodium hexametaphosphate ("N"), urea ("U"), or nothing but dispersed in an acidic aqueous solution having a pH value of 1 ("pH 1.0"). The solid phase contents were 20 or 30 vol %, the amounts of semicarbazide hydrochloride ("S") and sodium hexametaphosphate ("N") used were both 1.0% based on the weight of APA-0.2, and the amount of urea ("U") used was 2.0% based on the weight of APA-0.2. The mixtures were ultrasonicated at 28 KHz, 50W for a period of 20 minutes and followed ball-milled for 22 hours.

FIG. 1 shows the relationship between the shear rate and the slurry viscosity, measured with Brookfield DVII viscometer. There are four curves, pH1.0–30, S1030, N1030, and U2020 in FIG. 1, in which the first two digits of the numbers represent the weight of dispersing agents in grams used per 1000 g of alumina particles, except for pH1.0–30, and the last two digits thereof represent the solid contents of the alumina particles. As illustrated the slurry prepared with semicarbazide hydrochloride exhibits the lowest viscosity and a Newtonian behavior.

EXAMPLE 3

This example illustrates the preparation of aqueous colloidal dispersions of the following alumina particles with semicarbazide hydrochloride as a dispersing agent:

|   | $d_{50}$ (μm) | phase | specific surface area (m²/g) |
|---|---|---|---|
| 1. APA-0.2 (Ceralox Co., USA) | 0.2 | θ | 38 |
| 2 AKP-50 (Sumitomo Chemical Co., Ltd., Japan) | 0.1–0.3 | α | 9–16 |
| 3 A16-SG (Alcoa Industrial Chemicals, USA) | 0.5 | α | 9 |
| 4. AKP-30 (Sumitomo Chemical Co., Ltd., Japan) | 0.3–0.5 | α | 5–10 |

Figure 2:
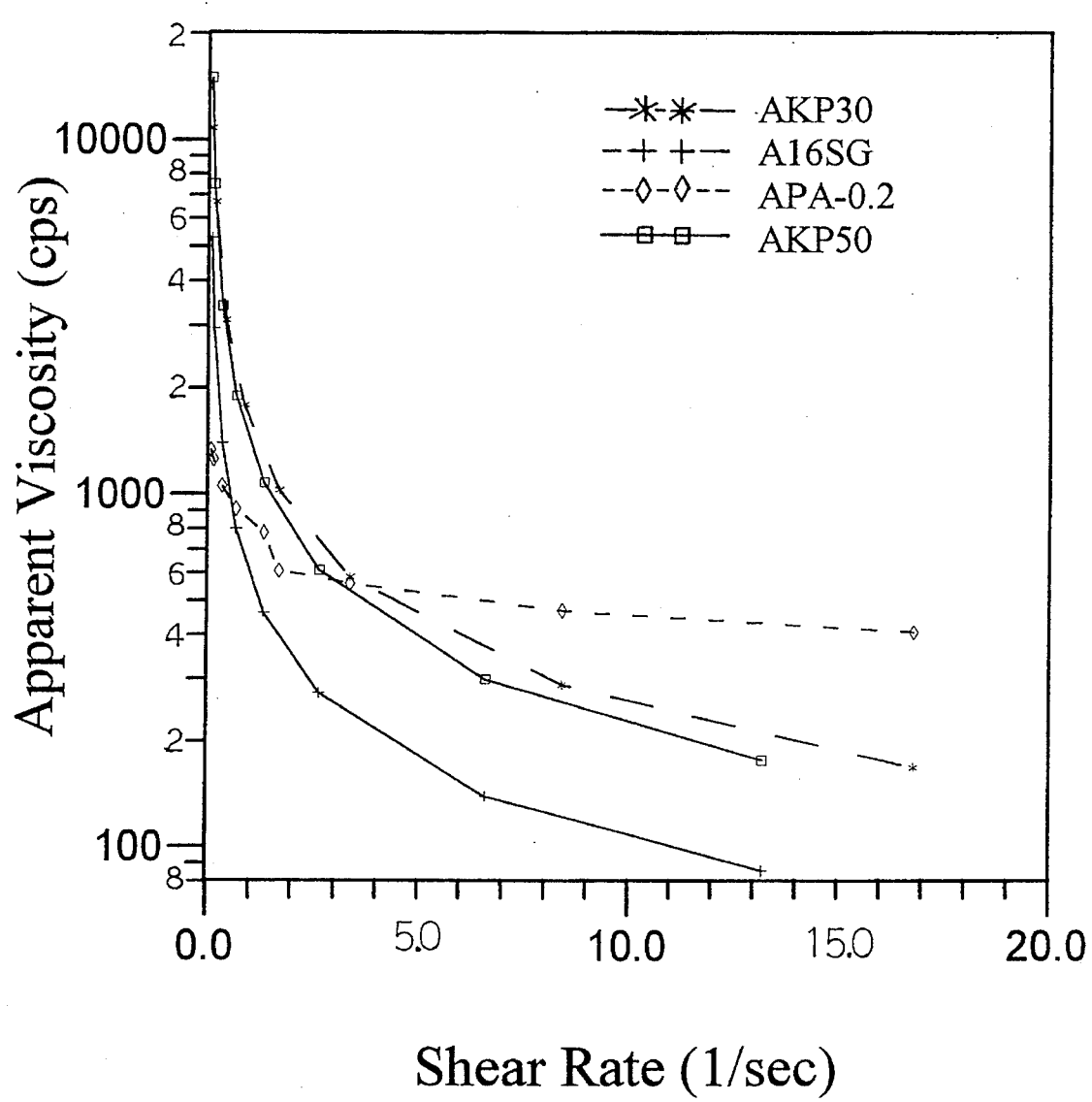
FIG. 2 shows the relationships between the shear rate and the viscosity of the dispersions prepared by the present dispersing agent and several different alumina powder.

FIG. 2 shows the relationship between the shear rate and the viscosity of different dispersions prepared in the same manner as Example 1 except that the solid content of alumina particles was 35 vol % and the amount of the dispersing agent used was 1.0% based on the weight of alumina particles. Although curves in FIG. 2 show the dispersions have a pseudoplastic rheological property, all the dispersions exhibit relatively low viscosity, high mobility, and are well dispersed.

EXAMPLE 4

The procedures of Example 2 were repeated except that no dispersing agents were used. Instead of using various dispersion agents, this example illustrates that APA-0.2 alumina particles were dispersed in aqueous solutions of various pH values. The pH value was adjusted by adding proper amount of HCl or NaOH. The viscosity of the dispersion, at 10% solid content, varies as the pH value of the solution varies. As shown in Table 2, the viscosity first increases then decreases as the pH value of the dispersion increases from 1.0 to 12.

TABLE 2

| pH before milling | 1.08 | 6.26 | 8.25 | 9.7 | 10.5 | 11.87 |
|---|---|---|---|---|---|---|
| pH after milling | 3.62 | 7.56 | 7.62 | 7.72 | 8.84 | 10.49 |
| Viscosity* (cps) | 7 | 100 | 5500 | 2200 | 3500 | 1120 |

*the shear rate used is 0.84 sec$^{-1}$.

EXAMPLE 5

The purpose of this example is to demonstrate how the density of green body and sintered ceramic product changes when factors such as amount of dispersion agent used, solid content of alumina particles, and pH value of the colloidal dispersion vary.

Seven ceramic slurries were manufactured by using the slurries prepared in accordance with the procedures of Example 2. The slurry was molded to form a green body by an air-compressing filtration technique (L. S. Chang, MS Thesis, National Taiwan University, June 1991). The green body after drying at room temperature for a week was sintered at 1500° C. for 2 hours. The results are shown in Table 3.

As shown in Table 3, there is no obvious relationship between the density of green body and the density of sintered ceramic products. However, the sintered ceramic products will have a higher relative density, 95.7% T.D. or above, when semicarbazide hydrochloride is used as a dispersing agent. The density of the sintered ceramic product designated as S1035 even reaches 97.6%.

TABLE 3

| Products* | Density of green body, % T.D. | Bulk density, % T.D. | Apparent density, % T.D. |
|---|---|---|---|
| S1015 | 42 | 98.6 | 99.2 |
| S1030 | 45 | 95.7 | 96.6 |
| S2035 | 45.7 | 96.3 | 96.8 |
| S1035 | 43.2 | 97.6 | 97.8 |
| pH 1.2-30 vol % | 42.9 | 94.5 | 96.5 |
| N0510 | 44 | 93.8 | 96.3 |
| pH 11-10 vol % | 42 | 95.6 | 98.3 |

*The products designation represents the slurry used therein, which has the definition same as FIG. 1.

Figure 3A:
FIG. 3(A) is a scanning electron micrograph (SEM) of a finished ceramic product made of sub-micrometer alumina powder by dispersing the submicrometer alumina particles in an acidic solution, casting, sintering, and thermally etching at 1400° C. for one hour.
Figure 3B:
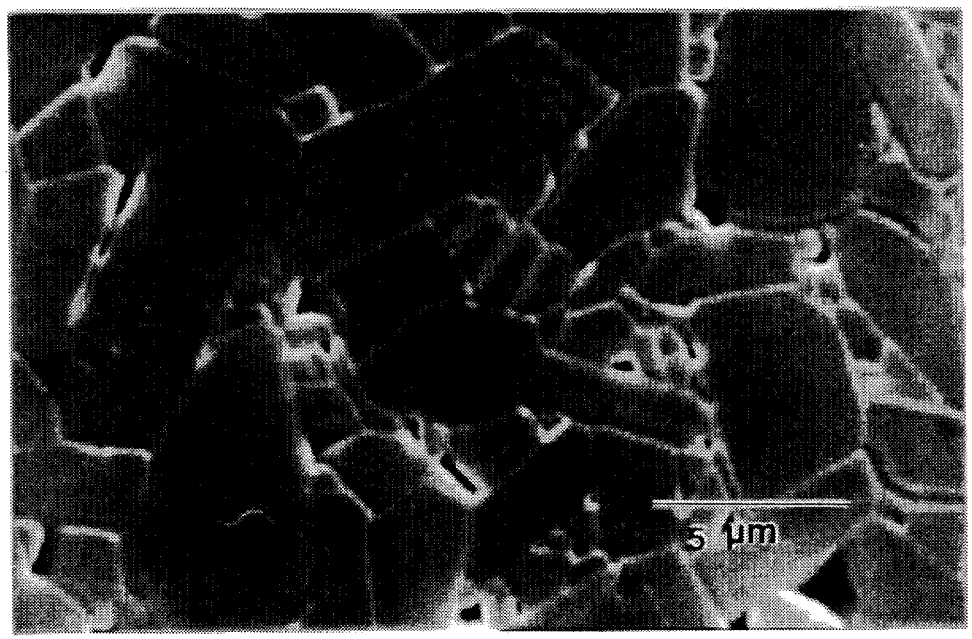
FIG. 3(B) is a scanning electron micrograph (SEM) of a finished ceramic product made of sub-micrometer alumina powder by dispersing the submicrometer alumina particles in a basic solution, casting, sintering, and thermally etching at 1400° C. for one hour.
Figure 4A:
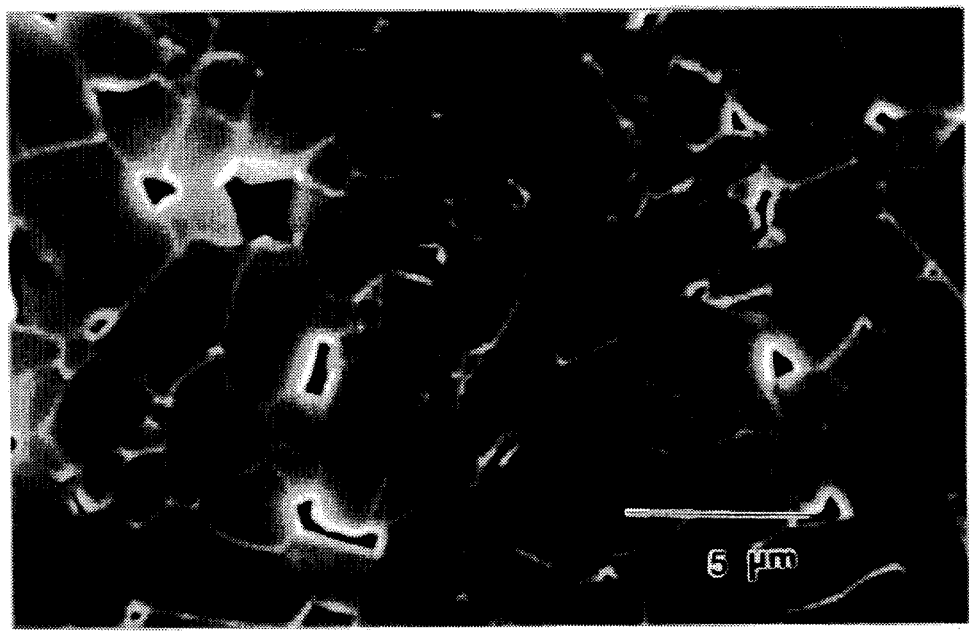
FIG. 4(A) is a scanning electron micrograph (SEM) of a finished ceramic product made of sub-micrometer alumina powder by dispersing the submicrometer alumina particles and 1.0 wt % of semicarbazide hydrochloride in an aqueous medium, casting, sintering, and thermally etching at 1400° C. for one hour.
Figure 4B:
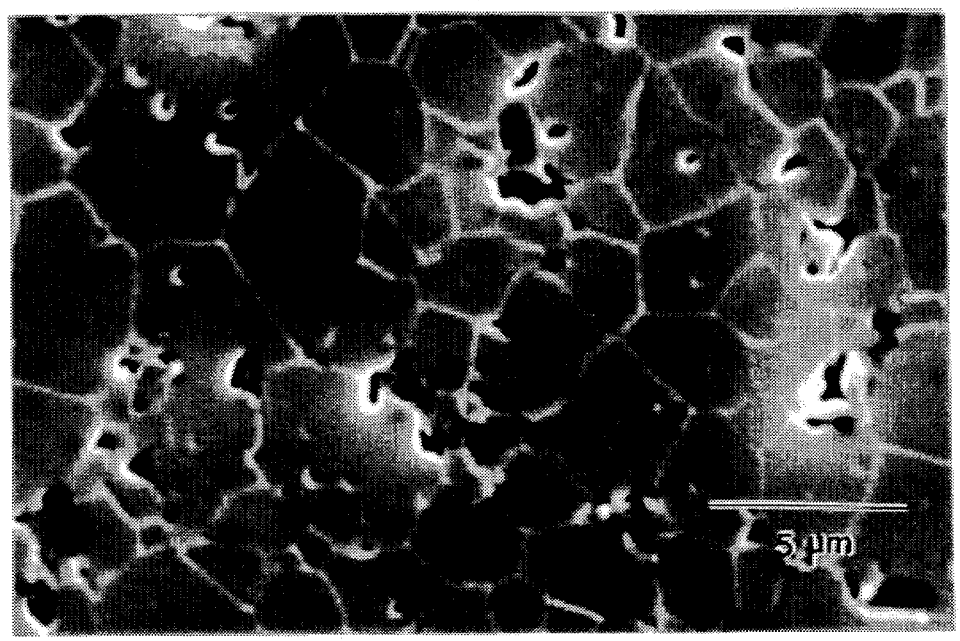
FIG. 4(B) is a scanning electron micrograph (SEM) of a finished ceramic product made of sub-micrometer alumina powder by dispersing the submicrometer alumina particles and 20 wt % of semicarbazide hydrochloride in an aqueous medium, casting, sintering, and thermally etching at 1400° C. for one hour.

Several sintered ceramic products of Table 3 were further polished and thermally etched at 1400° C. for 1 hour, and then the grain sizes thereof were observed through scanning electron micrograph (SEM). FIGS. 3(A) and 3(B) are SEMs of the sintered ceramic products designated as pH1.2–30 vol % and pH11-10 vol % respectively. The 3.4 μm average grain size of the former is significantly smaller than 5.6 μm, the average grain size of the latter. Moreover, elongated alumina crystals are existent in the alkaline sample. As shown in FIGS. 4(A) and 4(B), the sintered ceramic products designated as S1035 and S2035, which were prepared from two slurries having a same solid content but different amount of semicarbazide hydrochloride, exhibit similar microstructures with 3.9 μm average grain size. Compared with others, the sintered ceramic product designated as N0515 contains higher percentage of elongated crystals which grow at a faster rate. Among the crystals there are relatively large amount of pores, and it is believed that the liquid phase of the slurry participating the sintering may be the cause of this problem.

What is claimed is:

1. An aqueous colloidal dispersion of sub-micrometer alumina particles comprising 10 to 68% of sub-micrometer alumina particles having a surface area of 2.5 to 50 m² per gram of the alumina particles, based on the weight of said colloidal dispersion; 0.1 to 5% of a semicarbazide hydrochloride derivative, based on the weight of said alumina particles; and water as the balance, in which said semicarbazide hydrochloride derivative which functions as a dispersing agent has a chemical formula as follows:

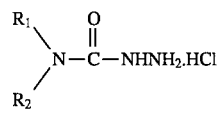

wherein $R_1$ and $R_2$ are hydrogen, $C_1$–$C_4$ alkyl group, or amino group independently.

2. The aqueous colloidal dispersion of sub-micrometer alumina particles according to claim 1, wherein $R_1$ and $R_2$ of said semicarbazide hydrochloride derivative are both hydrogen.

3. The aqueous colloidal dispersion of sub-micrometer alumina particles according to claim 2 comprising 30–68% of said alumina particles, based on the weight of said aqueous colloidal dispersion.

4. The aqueous colloidal dispersion of sub-micrometer alumina particles according to claim 2 comprising 0.1–2.0% of said semicarbazide hydrochloride derivative, based on the weight of said alumina particles.

5. The aqueous colloidal dispersion of sub-micrometer alumina particles according to claim 2, wherein said alumina particles have an average diameter of 0.1–0.6 micrometer.

6. The aqueous colloidal dispersion of sub-micrometer alumina particles according to claim 2, wherein said alumina particles have a purity greater than 96%.

7. The aqueous colloidal dispersion of sub-micrometer alumina particles according to claim 6, wherein said alumina particles have a purity greater than 99.0%.

* * * * *

UNITED STATES PATENT AND TRADEMARK OFFICE
CERTIFICATE OF CORRECTION

PATENT NO. : 5,518,660
DATED : May 21, 1996
INVENTOR(S) : Wei et al.

It is certified that error appears in the above-indentified patent and that said Letters Patent is hereby corrected as shown below:

In the Abstract, line 2, delete "submicrometer" and insert therefore -- sub-micrometer --.

Col. 1, line 64, delete "alumina" and insert therefore -- fumed silica --.

Col. 3, line 11, delete "submicrometer" and insert therefore -- sub-micrometer --.

Col. 3, line 16, delete "submicrometer" and insert therefore -- sub-micrometer --.

Col. 3, line 22, delete "submicrometer" and insert therefore -- sub-micrometer --.

Col. 4, line 37, delete "e-phase" and insert therefore -- θ-phase --.

UNITED STATES PATENT AND TRADEMARK OFFICE
CERTIFICATE OF CORRECTION

PATENT NO. : 5,518,660
DATED : May 21, 1996
INVENTOR(S) : Wei et al.

It is certified that error appears in the above-indentified patent and that said Letters Patent is hereby corrected as shown below:

Col. 4, line 43, delete "Riedelode" and insert therefore -- Riedel-de --.

Col. 6, line 66, delete "products" and insert therefore -- product's --.

Signed and Sealed this

First Day of October, 1996

Attest:

BRUCE LEHMAN

*Attesting Officer*     *Commissioner of Patents and Trademarks*